United States Patent
Luciano, Jr. et al.

(10) Patent No.: US 9,613,489 B2
(45) Date of Patent: *Apr. 4, 2017

(54) UNIVERSAL OVERLAY GAMES IN AN ELECTRONIC GAMING ENVIRONMENT

(75) Inventors: Robert A. Luciano, Jr., Reno, NV (US); Warren R. White, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 205 days.

This patent is subject to a terminal disclaimer.

(21) Appl. No.: 12/696,945

(22) Filed: Jan. 29, 2010

(65) Prior Publication Data

US 2010/0137062 A1    Jun. 3, 2010

Related U.S. Application Data

(63) Continuation of application No. 11/877,584, filed on Oct. 23, 2007, now abandoned, which is a continuation of application No. 10/437,867, filed on May 15, 2003, now Pat. No. 7,285,049.

(60) Provisional application No. 60/381,476, filed on May 17, 2002.

(51) Int. Cl.
*A63F 9/24*     (2006.01)
*G07F 17/32*    (2006.01)
*A63F 13/30*    (2014.01)

(52) U.S. Cl.
CPC .......... *G07F 17/3227* (2013.01); *A63F 13/12* (2013.01); *G07F 17/323* (2013.01); *G07F 17/3209* (2013.01); *G07F 17/3211* (2013.01); *G07F 17/3244* (2013.01); *A63F 2300/303* (2013.01)

(58) Field of Classification Search
CPC ................. G07F 17/3225; G07F 17/3227
USPC ................... 463/16–22, 25, 40–43
See application file for complete search history.

(56) References Cited

U.S. PATENT DOCUMENTS

| | | | |
|---|---|---|---|
| 4,837,422 A | 6/1989 | Dethloff | |
| 5,083,271 A | 1/1992 | Thacher et al. | |
| 5,761,649 A | 6/1998 | Hill | |
| 5,766,076 A * | 6/1998 | Pease et al. | 463/27 |
| 5,851,149 A | 12/1998 | Xidos et al. | |
| 6,006,034 A | 12/1999 | Heath | |
| 6,089,976 A * | 7/2000 | Schneider et al. | 463/16 |
| 6,089,980 A | 7/2000 | Gauselmann | |
| 6,135,884 A * | 10/2000 | Hedrick et al. | 463/20 |
| 6,159,097 A | 12/2000 | Gura | |
| 6,159,098 A * | 12/2000 | Slomiany et al. | 463/25 |

(Continued)

*Primary Examiner* — Jason Skaarup
*Assistant Examiner* — Alex F. R. P. Rada, II
(74) *Attorney, Agent, or Firm* — Seed IP Law Group LLP

(57) ABSTRACT

A system is disclosed herein for displaying winning and non-winning game results in a traditional gaming environment. The system uses an overlay game to present an entertaining display to a player upon the occurrence of a win or trigger event. An overlay game has limited capabilities and additionally is engineered to be usable on a variety of gaming machines. To be usable on a variety of gaming machines, the overlay game is intentionally kept simple; in one case, it comprises a visual display that is shown to a player upon the occurrence of a trigger event. In another embodiment, it requires a simple button press to start the overlay game. The overlay games are downloaded on an as-needed basis, run on the gaming machine, and then discarded.

50 Claims, 3 Drawing Sheets

(56) References Cited

U.S. PATENT DOCUMENTS

| | | | |
|---|---|---|---|
| 6,190,255 B1* | 2/2001 | Thomas et al. | 463/20 |
| 6,319,122 B1 | 11/2001 | Packes | |
| 6,394,907 B1* | 5/2002 | Rowe | 463/42 |
| 6,511,377 B1 | 1/2003 | Weiss | |
| 6,517,433 B2* | 2/2003 | Loose et al. | 463/20 |
| 6,605,001 B1* | 8/2003 | Tarantino | 463/22 |
| 6,620,045 B2* | 9/2003 | Berman et al. | 463/25 |
| 6,645,077 B2 | 11/2003 | Rowe | |
| 6,652,378 B2* | 11/2003 | Cannon et al. | 463/20 |
| 6,726,563 B1* | 4/2004 | Baerlocher et al. | 463/25 |
| 6,793,577 B1 | 9/2004 | Wilkins | |
| 7,083,518 B2* | 8/2006 | Rowe | 463/29 |
| 7,285,049 B1* | 10/2007 | Luciano et al. | 463/42 |
| 7,837,556 B2 | 11/2010 | Breckner | |
| 8,360,846 B1* | 1/2013 | Bennett et al. | 463/20 |
| 2003/0064771 A1* | 4/2003 | Morrow et al. | 463/16 |
| 2003/0064800 A1* | 4/2003 | Jackson et al. | 463/30 |
| 2003/0065954 A1 | 4/2003 | O'Neill | |
| 2003/0176217 A1 | 9/2003 | Vancura | |
| 2004/0219968 A1* | 11/2004 | Fiden et al. | 463/20 |

* cited by examiner

General Game Device Having An Overlay Module Therein

Method Of Playing
A Casino-Wide Promotional Game
On Video-Based Gaming Machines

UNIVERSAL OVERLAY GAMES IN AN ELECTRONIC GAMING ENVIRONMENT

CROSS-REFERENCE TO RELATED APPLICATIONS

This application is a continuation of U.S. patent application Ser. No. 11/877,584, filed Oct. 23, 2007, which is a continuation of U.S. patent application Ser. No. 10/437,867, filed May 15, 2003, now U.S. Pat. No. 7,285,049, issued Oct. 23, 2007, which claims the benefit of U.S. Provisional Application No. 60/381,476, filed May 17, 2002, which are herein incorporated by reference in their entirety. This application is also related to co-pending U.S. patent application Ser. No. 12/696,981 concurrently filed on Jan. 29, 2010, entitled UNIVERSAL OVERLAY GAMES IN AN ELECTRONIC GAMING ENVIRONMENT, which is hereby incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention pertains generally to networked gaming devices and networked gaming systems. More particularly, the invention is a system and method for dynamically downloading "overlay" games that can be played on a variety of gaming machines devices from a central server.

BACKGROUND

Gaming devices of various types are well known in the casino and gaming industry. In general, gaming devices such as slot machines, video poker machines, video keno machines, video lottery games, among others, allow users to play a game of chance or a lottery game in exchange for a wager. Depending on the outcome of the game, the player may be entitled to a prize, monetary or otherwise, which is paid to the player.

In some cases, a gaming device may provide a plurality of games for play by the player from a single machine. For example, certain video poker machines may provide various versions of video poker. In such cases, the player may select and play a game of choice from a menu of games. Game play is then carried out in accordance with the selected game. This arrangement provides the added advantage of providing play of more than one "base" or primary game from a single gaming device thereby providing the player with a more diverse gaming experience and encouraging more game play. Typically the programming for these games is provided on a memory residing within the gaming device. Upon selection of a game by the player, the associated programming is loaded and executed by a processor of the gaming device.

Another arrangement which provides the selection and play of multiple base games from a single gaming device utilizes a centralized server which is networked to one or more of the gaming devices. In this arrangement, the programming for the games is stored on the central server rather than residing locally on the gaming device. Upon selection of a game by the player on a gaming device, the selected game is distributed from the central server to the gaming device for execution thereon. Game play is then carried out in accordance with the selected game on the gaming device. This arrangement provides the added advantage that the library of games available for play may be provided centrally from a server, rather than locally on the gaming device. Accordingly, a larger library of games may be practically provided from a central storage source (the server) due to cost considerations.

While the prior art systems and methods provide more diverse game play of gaming devices by providing selection and play from a plurality of base games from a single device, several disadvantages are presented. First, marketing considerations prevent providing diversity of base games on the gaming devices because the artwork and presentation of a gaming device which is closely tied to the "theme" of the gaming device cannot be dynamically changed in response to the game selected by the player. Thus, it would be inappropriate to provide artwork to a slot machine game on a gaming device which provides play of video poker, for example. Such marketing would create confusion and thus frustration in the players of gaming devices. Second, controls for underlying base games are generally specific to each game. Thus, controls for a slot machine game would generally not be appropriate for controls for a video poker game or a video keno game, for example. Third, many base games incorporate bonus or secondary features requiring either specific mechanical controls and/or displays (e.g., a secondary bonus wheel, or a secondary board game). Furthermore, these secondary features tend to vary from game to game. Thus, while it may be possible to incorporate a base feature across multiple devices, it often becomes impractical or impossible to incorporate the associated bonus features of a based game across multiple devices.

Accordingly, there is a need for a system and method which provides for the dynamic distribution of overlay games to gaming devices from a central server, where the overlay game may be independent from the base game. The described embodiments satisfy these needs, as well as others, and generally overcome the deficiencies found in the background art.

SUMMARY

Persons of ordinary skill in the art will realize that the following description of the embodiments is illustrative only and not in any way limiting. Other embodiments of the invention will readily suggest themselves to such skilled persons having the benefit of this disclosure.

In general terms, one embodiment is a system and method for dynamically distributing and downloading "overlay games" to gaming devices which are networked to a central server. Unlike prior art games for gaming machines, the overlay game is generally independent from the base game or its associated secondary or bonus features. The overlay game is also gaming device independent, and thus does not require complex mechanical displays or controls. Instead, the overlay game may be played using the display and controls of the underlying base game (including, for one preferred embodiment, no player controls).

A gaming system in accordance with one embodiment will have a set of gaming machines (gaming devices) that have an additional software module therein that enables the gaming machine to (i) request an overlay game (ii) receive the executable code or executable image of an overlay game from a server (iii) temporarily store the image or code until the primary game ends (the current game cycle ends) so as to not interfere with any on-going primary game (iv) start the overlay game (v) let the overlay game finish and then (vi) erase the overlay game and/or reload the primary game and/or restart the primary game (by providing a starting execution address to the CPU or some similar action, as required by the specific installation and configuration of the gaming machine and the overlay game). As will be clear to a person having skill in the art and with the benefit of the present disclosure, the exact procedure used by an engineer to get the overlay game ready to execute after it is downloaded, and then to restart or reinitialize the primary game after the overlay game is finished, will depend on the architecture of each particular gaming machine. The exact procedures will be incorporated into the overlay game module, which will be specific to each gaming machine.

Note that it is currently expected that the image or code that was the overlay game will be erased, overwritten, or otherwise be made unusable upon restart of the primary game in most gaming machines, as few will have the storage space needed to keep an overlay image on-board. However, in the future as memory and storage costs continue to drop, it may be possible to keep one of more overlay games locally as well as downloading them when an overlay game trigger occurs.

The overlay games are intentionally different than the primary games or secondary games in gaming machines. First, they are intended to be universal; that is, they are intended to be viewed by a player on any gaming machine having a video display. Thus, the symbols or visual sequences must have universally understandable meanings. There can be no "learning curve," as is the case with primary games. Second, the interactions with players are intentionally limited. To be able to use it universally (i.e., on as many gaming machines as possible in any particular casino), it must be the case that the overlay game has (i) no player interactions (shows a visual sequence and awards any winnings without the player touching any player input) or (ii) limited player input. Limited player input means a simple button touch to start an overlay game, or something similar; no complex options, no settings, and no preferences as are found in primary games.

The purpose of the overlay game is to add additional novelty to the gaming floor by having universal entertaining visual (and audio) sequences shown to the player upon either a winning event or an overlay game trigger event (in the later case, the win may be predetermined or not). This is always in addition to a primary game; the overlay game cannot replace a primary or secondary game as a main game; it doesn't have the required complexity to act as the regular player game. For example, not only do overlay games not have the normal player input choices, the overlay game will not have a complete pay table of its own. It is expected that one preferred embodiment of overlay games will have no paytables at all. The overlay game will be used as an entertaining way to present a known outcome (with all calculations, and the like, done in the primary game or on a backend system using the overlay game as an additional source of player winnings over and above the primary game), or, the overlay game will use a single random event to determine a single winning amount. In the first case, the overlay game will have no capability to generate any winning event; it acts as a display mechanism for a known result. In the second case, the overlay game may have straightforward, simple mappings from a random event to a limited number of specific winning amounts; no primary-game-style full paytable is required. Thus, overlay games will have code devoted primarily to show an entertaining visual display to a player; there will be little, if any, code for calculating winnings nor will there be code for all the other control mechanisms required in the primary game.

DETAILED DESCRIPTION

Figure 1:
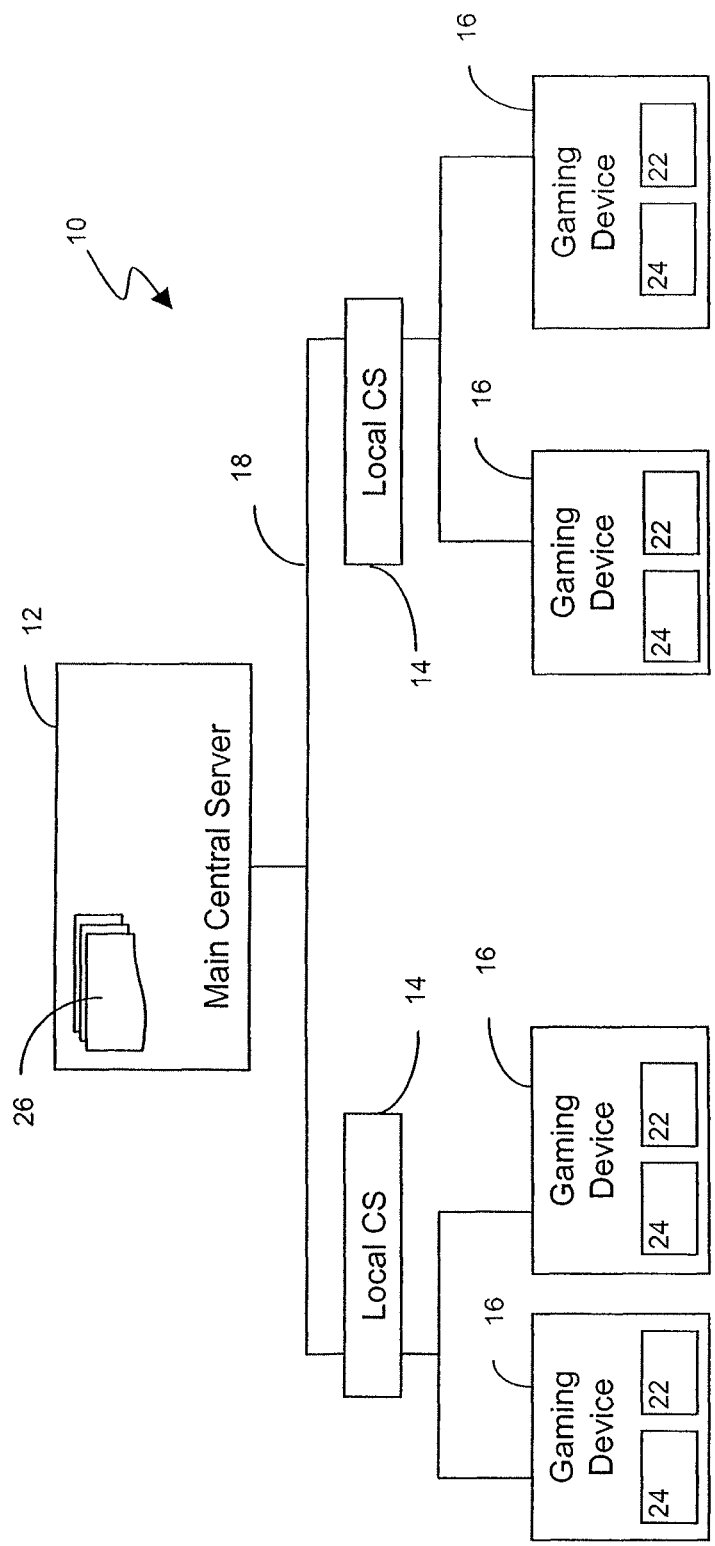
FIG. 1 is a block diagram of a system in accordance with one embodiment.

FIG. 1 illustrates a functional block diagram of an example system 10 arrangement suitable for use with the one embodiment. System 10 comprises a main central server 12 which distributes the overlay games in accordance with one embodiment to a plurality of gaming devices 16 through a network connection (wired or wireless, electronic or photonic). As shown in FIG. 1, groups of gaming devices 16 may be first networked to a local central server 14, each of which are then networked to the main central server 12. As would readily be apparent to one skilled in the art having the benefit of this disclosure, the local central servers 14 may carry out the operations of the main central server 12 at a local level, such as local distribution of overlay games. Thus, network 18 may identify a wide-area network connection, whereas networks 20 identify local area networks at individual gaming sites. In the alternative, the entire system 10 may be provided in a single gaming site, where the local networks 20 identify certain sections (e.g., banks of machines) within the site.

The gaming devices 16 comprise hardware and software for carrying out one or more base games 22, such as slot games, video poker games, video keno games, bingo games, video lottery games, or any other game where the game's outcome is based at least partially on chance. Additionally, each gaming device 16 further comprises an overlay game module 24 for carrying out the overlay game 26 distributed by the central server for play on the gaming device 16. The overlay module 24 may be incorporated as part of the base game 22 or may be a separately executed module by the gaming device 16.

Each gaming device 16 further comprises artwork and other presentation features associated with the particular base game 22 implemented thereon. Gaming device 16 further comprises bonus or secondary features associated with the particular base game 22. Overlay games 26 are designed to be suitable for use with any gaming device 16 which executes the overlay module 24 thereon.

Figure 2:
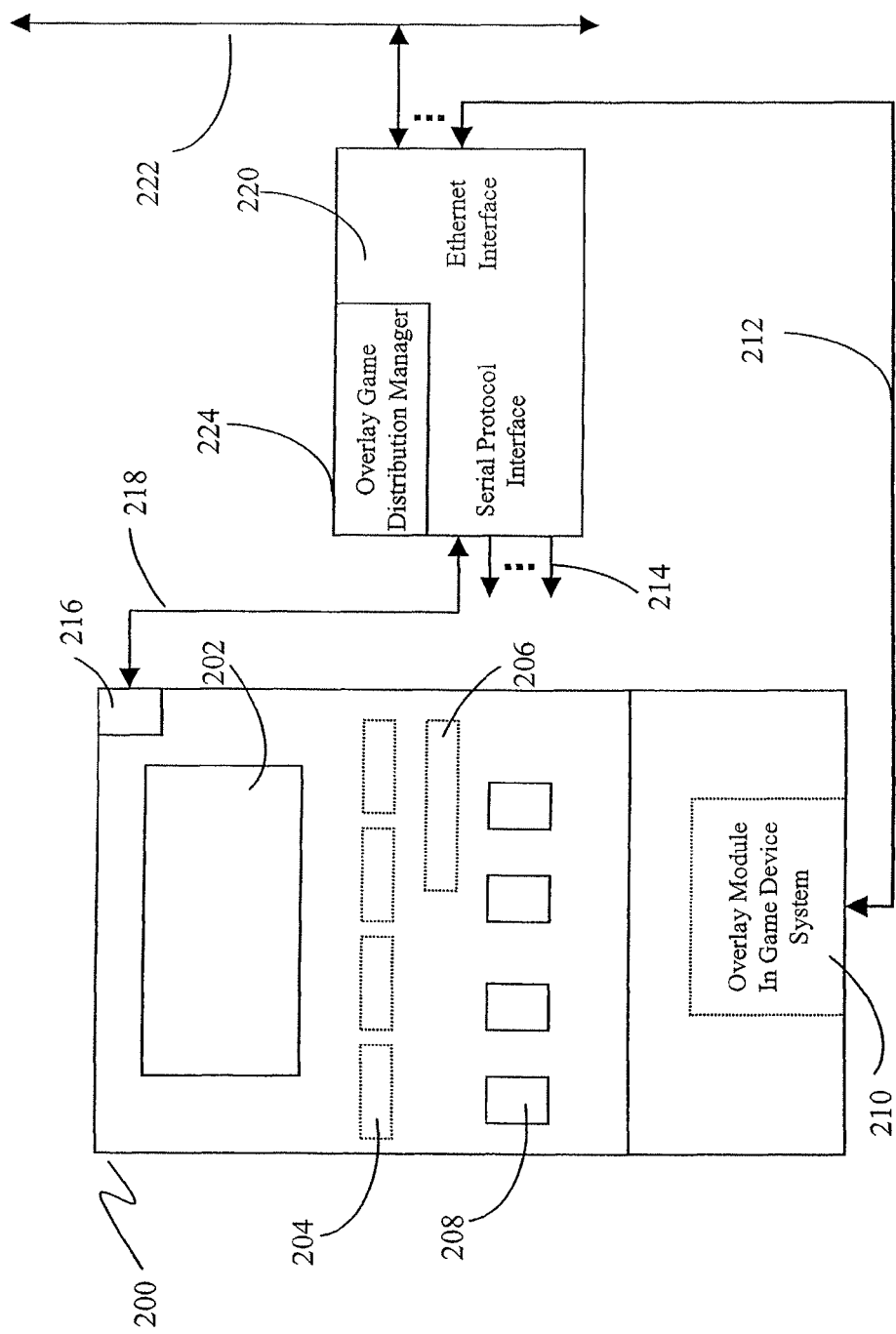
FIG. 2 is a block diagram of a gaming machine in accordance with one embodiment.

FIG. 2 shows more details of a gaming device ("gaming device," "game device," "game machine," and "gaming machine" are used interchangeably in this disclosure) configured for use with one embodiment. Game device 200 may be any type of electronic gaming machine having at least one video display 202, a SMIB (Slot Machine Interface Board) 216, a serial-protocol-based communications means 218 connected to a floor game controller 220 (this would be primarily used with legacy gaming machines), or the floor game controller 220 also having other serial ports 214. Game machine 200 also has one or more player-usable input devices shown generally as 204 (could be an RFID reader, smart card dock, memory card dock, traditional player card reader, bill and/or coin acceptors, a small touch-screen panel for programmable player buttons and custom messages, or a voucher printer/reader 206). Also shown are typical player buttons 208.

As will be understood by a person having knowledge in this art, there will also be internal electronic/photonic controls associated with I/O devices 204 and 206, and player game I/O devices 208. These will be operably connected to a main game board having a CPU, memory, and programming to run the primary game (and a secondary or bonus game, if there is one) in the game cabinet or game box. The primary and secondary games will be consistent with the game box artwork including all the glass, top box (if there is one), and displays. Internals, other than overlay module 210, are not shown.

Shown are two currently available network connections to overlay module 210. The first, through SMIB 216, was described above. This would be the connection used with legacy games. Connection 212 is an ethernet connection usable by the game overlay module 210. Ethernet connection 212 is shown as connected to floor game controller 220, which acts as a hub for connection to back-end ethernet 222. Please note that floor game controller 220 is only needed when legacy gaming machines are used; new installations can do away with floor controller 220, and the overlay game distribution manager 224 shown in floor controller 220 would reside entirely on a back-end server used to distribute overlay games (back-end or main server not shown), connected through an ethernet (SMIB 216 would not be used in such a case).

Whatever network connection is used, overlay module 210 is a software package that interfaces the overlay game into the gaming machine. This includes the halting of the primary game (always at a play boundary, i.e., between game plays or at the end of a game cycle), receiving the overlay game executable code, placing the image/code in memory, starting the overlay game (pointing to the right place in memory), and upon completion and restoration of the primary game.

In one preferred embodiment, the game device will include a player interface having a high-resolution touchscreen, approximately 6" square, in a bezel fitted into the portion of the cabinet below the bolster area (below where the play buttons are found), slanted up at the player at an angle to allow for easy reading and touching (ranging from approximately 25-45 degrees from vertical). The touchscreen would be usable by the primary game and the overlay game, allowing for distinct player input labels for each game.

Returning to FIG. 1, overlay game 26 is a new or added layer of promotional play on the gaming device 16. The overlay game 26 is played by the player using the display, controls and other I/O devices of the based game 22, and is distributed for play on the gaming device 16 through network connections 18, 20 by the central servers 12, 14. This arrangement allows new or modified overlay games 26 to be operated and loaded centrally and distributed centrally without affecting the integrity or operation of the base game.

Game play of the overlay game 26 may be triggered or initiated in various ways in accordance with the invention. For example, game play may be initiated pursuant to activity at a gaming device 16 (e.g., triggered by a game event on the base game or its associated secondary game, triggered after a preset number of plays, triggered after a preset number of plays within a time period, and the like). In other embodiments, play for the overlay game 26 may be centrally determined from predefined criteria (e.g., time of day, size of prize fund). In yet other embodiments, the overlay game 26 may be triggered by the status or identity of the player (e.g., via a player tracking identification means). As would be readily apparent to one skilled in the art having the benefit of this disclosure, various other triggering events may be used, such as any combination of the above, to trigger the play of the overlay game.

The prize of the overlay game 26 may be funded in various ways as well. One way to fund the overlay game prize is to allocate a certain percentage of wagers placed at the gaming devices 16. In other embodiments, the prize may be funded by a separate wager for a specific overlay game 26 in response to a prompt from the central servers 12, 14 to participate in the play of overlay game 26. The overlay game prize could also be funded from other casino sources such as a marketing promotion. Under this arrangement, the prizes may comprise cash, merchandise, or other services, changeable centrally per overlay game 26. Limited availability prizes or merchandise may be made available to select groups of players (e.g., players having high levels of player points as tracked by a player tracking system).

An important advantage to one embodiment is the ability to easily modify the overlay game 26 including its triggering events as well as its funding method as determined by the casino operator. Prior art implementations were strictly limited by the gaming arrangement of the base game 22. Another important advantage is the ability to utilize existing game terminal display, controls, printers, bill validators, coin acceptors, and coin payout hoppers for operation of the overlay games. The overlay game 26 is simply communicated from the central server to the gaming device 16 for execution by the overlay module 24. The overlay module 24 provides an interface to existing I/O devices for play of the overlay game 26 thereon. The system arrangement 10 allows the central servers 12, 14 to automatically transfer funds to and from the gaming devices 16 in response to overlay game awards, as well as overlay game wagers placed by the players.

The outcome of the overlay game 26 may be determined by the local gaming device 16 or may be determined locally by the central servers 14, 12. In either case, the presentation of the game is provided directly on the gaming device 16 using existing I/O devices by the overlay module 24. According to one embodiment, the display of the overlay game 26 may utilize the entire real estate of the gaming device display. In other embodiments, the display of the overlay game 26 may be presented in a smaller window (e.g., picture-in-picture mode) on the gaming device display.

One embodiment of an overlay game 26 may enable entry into a centralized multi-player "bonus" feature independent from the base game, which may or may not require additional payment. For example, one of fifty currently participating players may win a $1000 prize depending on the result of the overlay game. The winner may be determined by the central server 12 by randomly selecting one of the eligible players, for example.

According to another embodiment, eligible players are notified that they have been entered into a centralized lottery drawing to win a prize to be drawn at a predetermined time. The player remains eligible so long as the player remains actively playing the gaming device 16.

According to yet other embodiments of the invention, players may be grouped into teams to allow for competition among groups of players in a team format. The state of the overlay game may be preserved by the central servers 12, 14 and later restored either at the same or different gaming device 16. For example, the player's state may be preserved based on the players ID information (e.g., player tracking ID, customer ID). Alternatively, the player's state may be preserved through the use of printed vouchers or other tangible media (e.g., magnetic or smart cards) bearing unique identification information.

Figure 3:
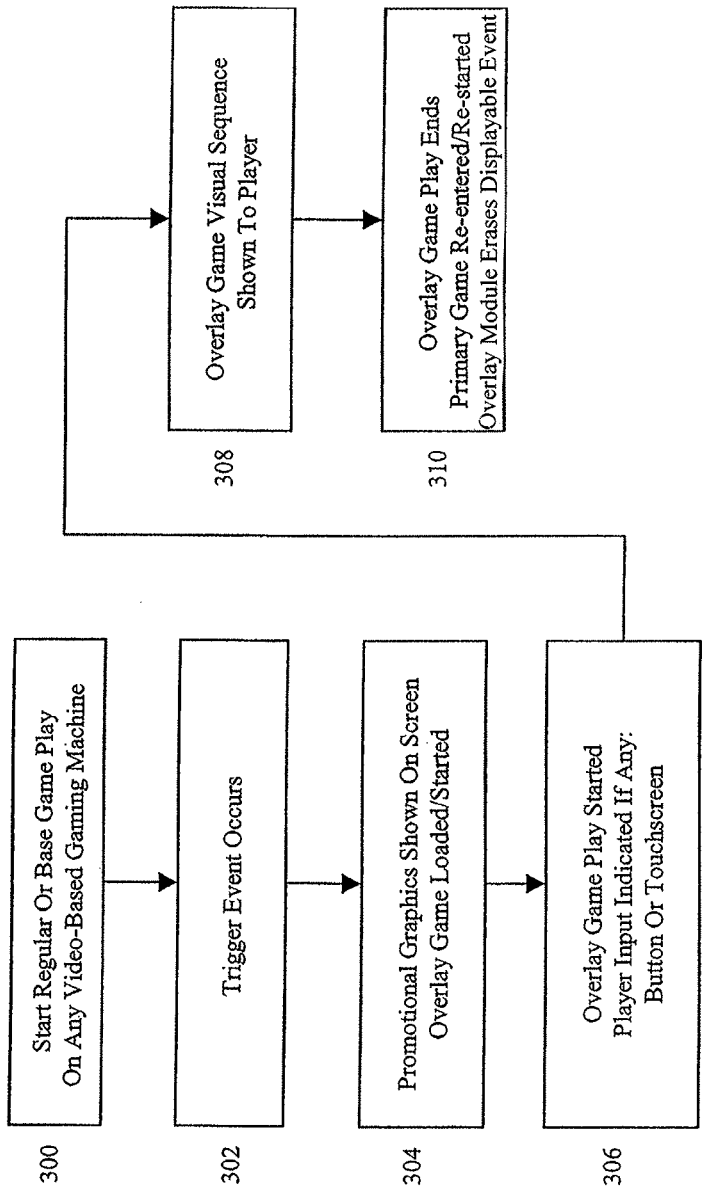
FIG. 3 is a flow diagram illustrating overlay game usage during game play.

FIG. 3 shows an example of game play according to one embodiment. Box 300 corresponds to a player going into a casino (or a bingo hall, keno hall, and the like) and starting game play at any electronic game machine. Game play will continue as "normal," where normal is the game play associated with the primary and secondary game (if any) installed on the game machine. Box 300 is left for box 302, which corresponds to the occurrence of a trigger event.

As discussed above, a triggering event may be an event that occurs in the primary game (a particular bonus or win event causes the overlay game to be called), or the trigger may be an external one (from a random selection of time or place, to a reward for a certain number plays, to any other criteria the casino chooses to use). One embodiment fully contemplates internal, external, or combinations of events usable to trigger the overlay game. In each case, the actions correspond to the overlay game software in the game device being invoked and action continuing into box 304.

The actions corresponding to box 304 are those needed to start the overlay game. It is expected that most embodiments will have an introductory screen to alert the player that they have been chosen (alternatively, that they won) a special game play with a special game. In one embodiment players will be shown a graphic illustrating the game and their interactions with the game (if any—not a requirement for this invention). In other embodiments, especially those where the overlay game has no player interactions and is designed to be shown very quickly, there will be no introductory visual sequence. The game will be shown; any awards won will be credited to the player, and will be over in a few minutes. In such cases, there is no need for an introductory sequence.

The overlay game itself will be requested and received by the overlay game module in the gaming machine. It is also possible to configure the system such that the overlay game download begins at the instigation of the server and the overlay game module in the gaming machine receives the overlay game code. In either case, the overlay game module will wait until any current primary game cycle is over and will then load and start the overlay game.

When describing the overlay games and their visual sequences to a player, it is to be understood that the overlay game may make use of other output devices as well, such as speakers for added dramatic effect. Overlay games must have visual output (video out) in order to work. Audio and other output is preferable but not required.

Box 304 is left for box 306. The first action is to start the overlay game. Since the overlay games must work with all game machines on a casino floor, they will be designed to require either no player input or limited player input. In the case of no player input, it will be a display-only game showing a gaming sequence on the screen to the player with no player interaction; the results will be a winning or non-winning event. In the case of some player input, the overlay game is designed to require player input that can be made visually distinguishable to a player using a simple blinking buttons approach. The "blinking buttons approach" includes, but is not limited to, having one of more of the primary game buttons blink or otherwise be visually distinguishable to a player from the other buttons (could turn off the backlights in all buttons except one, for example, instead of blinking), because the overlay game cannot assume anything about the button's physical labels. It is expected that the preferred embodiment of the overlay games will be to make use of the "play" or "start" button, as almost every game machine in a casino has a version of this button. The screen will make it obvious to the player that to start an action (some kind of action sequence on the game display, which will result in a game outcome); the player must touch the blinking (or otherwise distinguishable) button. If there is a touchscreen display, the player will be shown customized areas to touch on the touch screen.

In any event, the player will initiate game play if applicable. Box 306 is left for box 308. Box 308 corresponds to the overlay game being "run" or "played," which means a visual sequence is shown on the gaming machine's video display. Game play, for the overlay games, is intentionally simple and fast. The visual sequence shown to a player will end in a result that has already been determined before the visual sequence is shown to the player, or, a visual sequence in conjunction with a randomly-generated result to determine a winning (or non-winning) game play result. The overlay game visual sequence will be different from the primary or secondary game, and in most cases will not be themed like the primary game (because the overlay game can be shown on any gaming machine in the casino). "Themed" gaming machines include all the artwork on the cabinet, glass, and symbols shown to a player playing the primary game will have a theme, such as those using popular TV programs, those emphasizing a number or combination and named something like "Lucky 7s", and other themes such as pirates, ancient Egypt, a denomination such as Penny Pigout™, and the like. In each case, the artwork matches the theme of the game and its name.

An example of an overlay game visual sequence would be a screen shot of two dice; upon touching the "start" button, the dice are visually shown as rolling around until they stop, resulting in a payout or no payout. Another example would be a dart board with the tip of a dart in the foreground. The dart tip would be shown slowly traversing back and forth across a small area, visually appearing to traverse a target. The player would touch the "start" button when they think they are most likely to hit a high score on the dart board. The visual image then shows the dart projected forward in flight and hitting the target for a win or a no-win. Note that it is not necessary for the player to be using actual skill; where the dart lands on the target may be entirely determined by a random number draw.

Alternatively, the player's action could be programmed to partially affect the dart's path, such that an obviously off-target "start" results in a no-win for that throw and where a possible target hit is still determined by a random event. Whatever implementation is used (all are possible, including the use of a pre-determined outcome), the player uses the indicated input, the game's visual sequence is displayed, and any winning is credited to the player. Box 308 is left for box 310.

The actions corresponding to box 310 are those associated with finishing the overlay game visual sequence, pulling into memory the primary game (if needed), and re-initializing the primary game and gaming machine to restart and run the primary game.

The invention further relates to machine-readable media on which are stored embodiments of the present invention. It is contemplated that any media suitable for retrieving instructions is within the scope of the embodiments. By way of example, such media may take the form of magnetic, optical, or semiconductor media. The invention also relates to data structures that contain embodiments of the present invention and to the transmission of data structures containing embodiments of the present invention.

Although the description above contains much specificity, these should not be construed as limiting the scope of the invention but as merely providing an illustration of the presently preferred embodiment of the invention.

One of ordinary skill in the art will appreciate that not all of the above-described system and/or methods have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming system for presenting displayable events on a gaming device, the system comprising:
   two or more gaming devices, each gaming device including a display for displaying a base game and bonus or secondary features associated with the base game, and a displayable event thereon, the displayable event being independent of the base game and bonus or secondary features associated with the base game;
   a server having a memory for storing the displayable event, wherein the server is connected to the two or more gaming devices via a network; and
   an overlay module connected to the two or more gaming devices and the server via the network and being a separately executable module from the base game, wherein the overlay module downloads the displayable event, initiates presentation of the displayable event on the display of the gaming device, and restores the base game upon completion of the displayable event;
   wherein the gaming system enables a state of the displayable event to be saved and reproduced at a later time on another gaming machine in the network independent, separate and distinct of a state of the base game which remains in its entirety.

2. The system of claim 1, wherein the displayable event is a different theme than the base game, and wherein the displayable event is displayed over the display of the base game.

3. The system of claim 1, wherein displayable events are stored in the memory of the server, and wherein the displayable event is distributed to at least one gaming device from the server via the network in response to a request from the gaming device.

4. The system of claim 1, wherein displayable events are stored in a memory of the gaming machine.

5. The system of claim 1, wherein the displayable event is an overlay game.

6. The system of claim 5, wherein an arrangement of the gaming machine and the server in the network allows the overlay game on the gaming machine to be operated and loaded centrally from the server without affecting the integrity or operation of the base game.

7. The system of claim 5, wherein the server allows automatic transfer of funds to and from the gaming machine in response to overlay game awards and overlay game wagers placed by players.

8. The system of claim 1, wherein the displayable event is an entertaining visual display.

9. The system of claim 1, wherein the displayable event is a promotion.

10. The system of claim 1, wherein the overlay module initiates presentation of the displayable event in a window on the display.

11. The system of claim 10, wherein the window on the display of the gaming machine is a picture-in-picture mode on the display.

12. The system of claim 1, wherein the overlay module initiates presentation of the displayable event on the entire display of the gaming device.

13. The system of claim 1, wherein the overlay module stores the displayable event received from the server.

14. The system of claim 13, wherein the overlay module erases the displayable event stored thereon.

15. The system of claim 1, wherein an overlay module is incorporated into each gaming device.

16. The system of claim 1, wherein an overlay module is associated with each gaming device, and wherein each overlay module is separate and distinct from its associated gaming device.

17. The system of claim 1, wherein the overlay module initiates presentation in response to a trigger.

18. The system of claim 17, wherein the trigger is based on a game event on the base game, a factor separate from the base game, or player information.

19. The system of claim 1, wherein the overlay module is connected to the server via the network including an Ethernet connection.

20. The system of claim 1, wherein the overlay module is connected to a floor game controller via a front-end Ethernet connection and the floor game controller is connected to the server via a back-end Ethernet connection.

21. The system of claim 1 wherein the overlay module provides an interface to input and output devices of the gaming machine for operation of the displayable event.

22. The system of claim 21, wherein the input and output devices include printers, touch screens, game terminal displays, cabinet buttons, bill validators, speakers, spin buttons, coin acceptors, coin payout hoppers, or combination thereof.

23. The system of claim 1, wherein the overlay module erases the displayable event from a memory associated with the gaming device upon completion of the displayable event.

24. A gaming system for displaying events on a gaming device, comprising:
   a plurality of gaming devices each including a processor, memory containing software instructions for carrying out a base game and bonus or secondary features associated with the base game, and a display enabling simultaneous presentation of the base game and a displayable event on the display, the displayable event being independent of the base game and bonus or secondary features associated with the base game;
   a server including a processor and memory for storing the displayable event, wherein the server is connected to the plurality of gaming devices via a network; and
   a module in communication with the plurality of gaming devices and the server and being a separately executable module form the base game, wherein the module enables requesting and receiving the displayable event, presenting the displayable event on the display of the gaming device, and erasing the displayable event from the gaming device memory upon completion of the displayable event;

wherein the gaming system enables a state of the displayable event to be saved and reproduced at a later time on any gaming machine in the network independent, separate and distinct of a state of the base game which remains in its entirety.

25. The system of claim 24, wherein the displayable event is a different theme than the base game, and wherein the displayable event is displayed over the display of the base game.

26. The system of claim 24, wherein displayable events are stored in the memory of the server, and wherein the displayable event is distributed to at least one gaming device from the server via the network in response to a request from the gaming device.

27. The system of claim 24, wherein the displayable event is an overlay game.

28. The system of claim 27, wherein an arrangement of the gaming machine and the server in the network allows the overlay game on the gaming machine to be operated and loaded centrally from the server without affecting the integrity or operation of the base game.

29. The system of claim 27, wherein the server allows automatic transfer of funds to and from the gaming machine in response to overlay game awards and overlay game wagers placed by players.

30. The system of claim 24 wherein the displayable event is an entertaining visual display.

31. The system of claim 24, wherein the displayable event is a promotion.

32. The system of claim 24, wherein the module initiates presentation of the displayable event in a window on the display.

33. The system of claim 32, wherein the window on the display of the gaming machine is a picture-in-picture mode on the display.

34. The system of claim 24, wherein the module initiates presentation of the displayable event on the entire display of the gaming device.

35. The system of claim 24, wherein the module stores the displayable event received from the server.

36. The system of claim 24, wherein an overlay module is incorporated into each gaming device.

37. The system of claim 24, wherein an overlay module is associated with each gaming device, and wherein each overlay module is separate and distinct from its associated gaming device.

38. The system of claim 24, wherein the overlay module initiates presentation in response to a trigger.

39. The system of claim 38, wherein the trigger based on a game event on the base game, a factor separate from the base game, or player information.

40. The system of claim 24, wherein the module is connected to the server via the network including an Ethernet connection.

41. The system of claim 24, wherein the module is connected to a floor game controller via a front-end Ethernet connection and the floor game controller is connected to the server via a back-end Ethernet connection.

42. The system of claim 24, wherein the overlay module provides an interface to input and output devices of the gaming machine for operation of the displayable event.

43. The system of claim 42, wherein the input and output devices include printers, touch screens, game terminal displays, cabinet buttons, bill validators, speakers, spin buttons, coin acceptors, coin payout hoppers, or combinations thereof.

44. A gaming system for presenting displayable events on a gaming device, the system comprising:

two or more gaming devices, each gaming device including a processor, memory containing software instructions for carrying out a base game and bonus or secondary features associated with the base game, and a display that enables simultaneous presentation of the base game and a displayable event on the display, the displayable event being independent of the base game and bonus or secondary features associated with the base game, wherein the simultaneous presentation of the base game and the displayable event is adjacent, overlapping, spaced in close proximity, or combinations thereof on the display;

a server having a memory storing one or more displayable events, wherein the server is connected to the two or more gaming devices via a network, and wherein a displayable event is distributed to at least one gaming device via the network in response to a request; and an overlay module connected to the two or more gaming devices and the server via the network and being a separately executable module form the base game, wherein the overlay module initiates presentation of the displayable event on the display of the gaming device;

wherein the gaming system enables a state of the displayable event to be saved and reproduced at a later time on another gaming machine in the network independent, separate and distinct of a state of the base game which remains in its entirety.

45. The system of claim 44, wherein the displayable event is a different theme than the base game, and wherein the displayable event is displayed over the display of the base game.

46. The system of claim 45, wherein the displayable event is an overlay game.

47. The system of claim 46, wherein an arrangement of the gaming machine and the server in the network allows the overlay game on the gaming machine to be operated and loaded centrally from the server without affecting the integrity or operation of the base game.

48. The system of claim 46, wherein the server allows automatic transfer of funds to and from the gaming machine in response to overlay game awards and overlay game wagers placed by players.

49. The system of claim 44, wherein the overlay module provides an interface to input and output devices of the gaming machine for operation of the displayable event.

50. The system of claim 49, wherein the input and output devices include printers, touch screens, game terminal displays, cabinet buttons, bill validators, speakers, spin buttons, coin acceptors, coin payout hoppers, or combinations thereof.

* * * * *